United States Patent [19]
Boticki et al.

[11] Patent Number: 5,678,592
[45] Date of Patent: Oct. 21, 1997

[54] BACK FLOW PREVENTION DEVICE

[75] Inventors: John A. Boticki, Racine; James H. Lohr, Yorkville Township, Racine County; Charles E. Seaman, Jr., Kenosha, all of Wis.

[73] Assignee: S. C. Johnson & Son, Inc., Racine, Wis.

[21] Appl. No.: 624,848

[22] Filed: Mar. 26, 1996

Related U.S. Application Data

[63] Continuation-in-part of Ser. No. 587,265, Jan. 16, 1996, abandoned.

[51] Int. Cl.[6] ............................. F16K 24/04; E03C 1/10
[52] U.S. Cl. ..................... 137/216; 137/615; 137/801; 137/861; 137/888
[58] Field of Search ............................. 137/216, 615, 137/801, 861, 888

[56] References Cited

U.S. PATENT DOCUMENTS

| | | |
|---|---|---|
| 280,589 | 3/1883 | Dimelow . |
| 1,954,105 | 4/1934 | Stoddard . |
| 2,056,357 | 10/1936 | Luff .......................... 137/111 |
| 2,250,291 | 7/1941 | Boosey ...................... 137/216 |
| 2,288,247 | 6/1942 | Kunstorff .................. 137/111 |
| 3,034,731 | 5/1962 | Chapin ...................... 239/318 |
| 3,072,137 | 1/1963 | McDougall ............... 137/216 |
| 3,158,169 | 11/1964 | Smith ....................... 137/216 |
| 3,166,086 | 1/1965 | Holmes .................... 137/217 |
| 3,863,843 | 2/1975 | Hechler, IV .............. 239/318 |
| 4,142,681 | 3/1979 | Hechler, IV .............. 239/318 |
| 4,247,046 | 1/1981 | Hechler, IV .............. 239/318 |
| 4,314,673 | 2/1982 | Rudelick ................. 137/861 X |
| 4,414,998 | 11/1983 | Rudler et al. ........... 137/216 |
| 4,538,636 | 9/1985 | Cleland .................... 137/216 |
| 4,697,610 | 10/1987 | Bricker et al. .......... 137/216 X |
| 5,159,958 | 11/1992 | Sand ........................ 137/888 |
| 5,240,029 | 8/1993 | Ludewig ................. 137/217 |
| 5,253,677 | 10/1993 | Sand ........................ 137/888 |
| 5,305,778 | 4/1994 | Traylor .................... 137/216 |
| 5,518,020 | 5/1996 | Nowicki et al. ......... 137/216 |
| 5,522,419 | 6/1996 | Sand ........................ 137/216 |

*Primary Examiner*—Gerald A. Michalsky
*Attorney, Agent, or Firm*—R. E. Rakoczy; J. W. Frank

[57] ABSTRACT

Disclosed is an improved device (10) for preventing back flow of possibly-contaminated water into a potable water system. The device (10) includes first, second and third nozzles (33, 35, 37) in series flow relationship, and an air gap (49) between the first and second nozzles (33, 35). In the improvement, the air gap (49) is a primary air gap and the device (10) includes a secondary air gap (19) fixed with respect to the second nozzle (35). In a more specific aspect of the new device (10), the second and third nozzles (35, 37) are in a tubular housing (41) and the device (10) includes a containment bowl (21) around the housing (41). The secondary air gap (19) includes an aperture (53) in the housing wall (55) and such aperture (53) opens to the containment bowl (21). Other aspects of the new device (10) involve particular nozzle configurations and relationships and a restrictor (103) inhibiting back flow.

28 Claims, 8 Drawing Sheets

BACK FLOW PREVENTION DEVICE

This application is a continuation-in-part of application Ser. No. 08/587,265 filed on Jan. 16, 1996, now abandoned.

TECHNICAL FIELD OF THE INVENTION

This invention relates generally to fluid handling and, more particularly, to prevention of back flow, i.e., "back siphoning," in a fluid handling system.

BACKGROUND ART

Pressurized municipal water systems having a network of piping and faucets used to draw water from the system are in wide use and have been for well over a century. For almost as long, it has been recognized that in certain circumstances, pressure in the system (or in a localized part thereof) may diminish to a low level, e.g., below atmospheric pressure.

For example, if a user is drawing water from a faucet on, say, the second floor of a multi-story building and a fire stand pipe is opened at ground level, water pressure at the faucet may temporarily diminish to below atmospheric pressure. In a more common example, flushing a toilet may cause the pressure in a nearby faucet connected to the same part of the water main to fall dramatically. And users of shower baths often experience a sudden change in water temperature if a toilet is flushed or another sudden demand made on the water supply system.

It has also been long recognized that in the event of a drop in water pressure at a faucet or the like, there is a possibility that liquid in a container external to the system may be inadvertently drawn into the system. If the system distributes potable water (as is nearly always the case) and if the liquid in the container is impure in any way and is drawn into the system, the system may be contaminated.

Household kitchen sinks incorporate an early and very simple solution to this problem. To avoid drawing dirty water from the sink into a faucet in event of undue pressure drop, the faucet discharge opening is spaced above the elevation of the sink "flood level," i.e., the sink rim, by some distance, e.g., one inch (2.54 cm) or more. The resulting air gap between such opening and any liquid in the sink makes it impossible for sink water to be siphoned "backwards" into the faucet discharge opening, even if the liquid in the sink is at or overflowing the sink rim. This arrangement is described in American National Standards Institute (ANSI) Standard A112.1.2-1973 (R-1942) as promulgated by the American Society of Mechanical Engineers.

And for the same reason, it is common to space the end of the discharge pipe of a household dishwasher an inch (2.54 cm) or so above the line leading to the sewer. An example of a fitting suitable for that purpose is disclosed in U.S. Pat. No. 3,158,169 (Smith). Such fitting introduces an air gap between the upper waste pipe (from which dirty water flows) and the soil pipe below it which receives such dirty water. Fittings of this type are sometimes referred to as "vacuum breakers."

But that is not the end of the matter of preventing contamination of pressurized potable water systems. Other uses for water faucets are attended by the need to prevent backflow in more complex "operating environments." For example, one may wish to mix water from a faucet with a detergent concentrate in a container to form a more dilute washing solution. It is apparent that if one end of a hose is connected to the faucet and the other end immersed in the concentrate, a sudden drop in faucet water pressure might cause such concentrate to be drawn backwards through the hose and into the faucet and the water system.

And faucet water pressure need not drop to below atmospheric pressure to risk contaminating the water supply. If faucet water pressure falls to a level below that of the vessel containing, e.g., a dilute washing solution, the pressure in such vessel may cause the solution to back flow into the water system. Much the same result could occur if the vessel is elevated well above the faucet.

Back flow prevention techniques are often combined with venturi-type mixing devices, sometimes known as eductors. Such devices use a principle discovered by Daniel Bernoulli (1700-1782) and are used for applications involving mixing of two liquids, e.g., water and liquid chemical products. Examples of such devices are disclosed in U.S. Pat. Nos. 3,072,137 (McDougall) and 3,166,086 (Holmes), among several others.

The McDougall device has an upper water inlet coupling attached to a faucet and a side fitting for attaching a hose leading to a detergent container. When the faucet is turned on and when a valve button is depressed, detergent is drawn into the device and mixes with water. The dilute mixture is discharged out of the lower nozzle portion.

For back flow prevention, the McDougall device includes a chamber which is in air flow communication with passageways. Such passageways, which extend between the chamber and ambient air, maintain the pressure in the chamber at atmospheric pressure. Thus, if faucet pressure falls to below ambient pressure, ambient air rather than detergent or water/detergent mixture is drawn into such faucet. The McDougall device was found acceptable for so-called "low hazard" products with which faucet water was to be mixed.

Similar devices are disclosed in U.S. Pat. Nos. 4,697,610 (Bricker et al.); 5,159,958 (Sand) and 5,253,677 (Sand). The proportioner of the Bricker et al. patent was found generally satisfactory but in the commercial embodiment included an air gap of only about one-eighth inch (0.32 cm). It is understood that such proportioner does not meet ANSI standards.

A problem with the eductor disclosed in the Sand '958 patent is that when the water stream flows from the faucet across the air gap to the central opening and what is described as its conical sloped portion, not all of the water entered such central opening. To put it in other terms, there is a significant amount of lateral "splash" toward the slots leading to ambient air. To prevent water from splashing out of the air gaps, the eductor includes opaque, upwardly-extending tabs that substantially prevent such "splash-out." However, it is understood that persons charged with enforcing plumbing codes found this objectionable because the tabs prevented one from visually observing the presence of the air gap.

To address this objection, the eductor of the Sand '677 patent uses windows (which are understood to be transparent) radially inwardly offset from the eductor tubular body. But apparently this, too, was found objectionable because a plumbing inspector was prevented by the windows from physically passing an object or a finger through the air gap.

A characteristic of the mixing eductors disclosed in the Sand '958 and '677 patents relates to the collection chamber (the '958 patent) or the collection section (the '677 patent) of such eductors. Liquid which enters such chamber or section (presumably because the venturi section cannot accept the flow rate imposed upon it) is permitted to drain out to the solution tank rather than being bypassed to a separate drain or the like. And there is seemingly no way that a user of such an eductor can use it to fill a pail or other container with fresh water.

Another characteristic of the mixing eductors disclosed in the Sand '958 and '677 patents manifests itself if the vessel containing the chemical or the vessel containing the mixed solution are elevated above the eductor or if such vessels are pressurized for some reason. In either event, it appears that if water flow from the faucet is stopped, the chemical and/or solution "backs up" into the eductor air gap chamber and flows out of the slots to the floor.

Yet another characteristic of certain back flow prevention devices is that they must be oriented vertically. But sometimes vertical orientation is not practical or even possible. And yet another characteristic of such devices when combined with a mixing eductor is that reasonably-high water pressure is required to provide adequate downstream pressure drop to "drive" the eductor for satisfactory mixing.

Still another characteristic of certain back flow prevention devices is that they introduce undesirably high pressure drop in the water flow path. For example, the conical opening and converging nozzle mentioned in the Sand '958 and '677 patents, respectively, present relatively-long flow passages to a stream of water passing through such passages. And long flow passages impose higher pressure drops, leaving less pressure available for the mixing function.

Yet another characteristic of certain back flow prevention devices (the eductor of the Sand '677 patent for example) is that they are less-than-ideally suited for use with systems involving an apparatus containing concentrated liquids such as cleaning liquids. Such apparatus may be equipped with electromagnetic valves, the function of which is impaired by permitting air to enter the valves or the line leading to the valves. That can occur when the apparatus is mounted above the device and "loses prime." That is, by force of gravity, water flows backward in the line away from the apparatus.

And there is yet another matter of concern when conventional devices of the type not having an air gap are used to "feed" dispensing equipment such as equipment mixing water and concentrated cleaning liquids to obtain a cleaning solution. Commonly, faucets used by custodial staff have hot and cold water delivery pipes, each fitted with its own shutoff valve. The pipes are joined downstream of the valves and feed a common faucet. If both water delivery pipes are allowed to remain open, then water "cross-flow" between the hot and cold water pipes may occur.

A back flow prevention device which addresses and resolves some of the problems and shortcomings of earlier devices would be an important advance in the art.

DISCLOSURE OF THE INVENTION

An object of the invention is to provide an improved back flow prevention device that overcomes some of the problems and shortcomings of the prior art.

Another object of the invention is to provide a back flow prevention device which substantially eliminates device "back splashing."

Another object of the invention is to provide a back flow prevention device having a primary air gap that is visually discernable and sufficiently large to pass a human adult finger therethrough.

Yet another object of the invention is to provide a back flow prevention device which bypasses back-siphoning liquid to a separate discharge path away from a source of potable liquid such as a water faucet.

Another object of the invention is to provide a back flow prevention device which may be used to fill an auxiliary container with liquid when the device is not in use for solution preparation.

Still another object of the invention is to provide a back flow prevention device that is arranged to prevent liquid spilling.

Another object of the invention is to provide a back flow prevention device that has reduced flow-through pressure drop.

Yet another object of the invention is to provide a back flow prevention device that, in a single-faucet, two-valve water system, avoids back pressure at a faucet and substantially eliminates "cross-flow" between hot and cold water lines.

Another object of the invention is to provide a back flow prevention device that is operable in a variety of positions including vertical, horizontal and angular.

Another object of the invention is to provide a back flow prevention device useful in a system that inhibits or prevents gravity-induced back flow of water.

These and other objects are accomplished by the invention which involves an improvement to a device that has three nozzles in series, coaxial flow relationship with an air gap between the first and second nozzles. In the improvement, the air gap is a primary air gap and the device includes a secondary air gap fixed with respect to the second nozzle. Along with the air gaps, the device includes a drain outlet positioned so that it is in flow communication with the secondary air gap.

In another aspect of the invention, the second and third nozzles are in a tubular housing and the housing is surrounded by a containment bowl. The housing has a wall and an aperture therethrough which forms the secondary air gap. Such aperture opens to the containment bowl which is connected to the drain outlet.

In another aspect of the invention, the device has a fourth nozzle in the housing and in a series, coaxial flow relationship with the first, second and third nozzles. The fourth nozzle has a distal end which is in sealed engagement with the containment bowl. And each of the device nozzles has a discharge opening, the nozzle openings having progressively increasing area when considered in a downstream direction.

The improved back flow prevention device also has an inlet screen apparatus for changing incoming liquid flow from turbulent to substantially laminar. In one embodiment, the apparatus has a plurality of sharp edges extending into the liquid flow, preferably in an upstream direction. In another embodiment, the screen apparatus has a plurality of screens in overlapping, coaxial flow relationship.

More specific embodiments of the invention involve the configuration(s) of the individual nozzle(s). For example, in a highly preferred embodiment, the first (or upstream) nozzle has a sharp-edged opening which has a first flow area for discharging liquid to the second nozzle. This opening is "knife-like" or sharp-edged in that the ratio of the diameter of the opening to the axial length is between about 10:1 and about 21:1. In a specific embodiment, the axial length of the opening is no more than about 0.010 inches (0.25 mm). The foregoing configuration of the first nozzle helps minimize resistance to liquid flow.

The second nozzle has a dual taper with a first portion converging at a first angle and a second portion converging at a second angle that is between 10° and 30° and yet is less than the first angle. These portions abut at a junction which defines a second flow area and the ratio of the second flow area to the first flow area is between about 1.05:1 and about 2:1.

Similarly, the third nozzle also has a dual taper. Such nozzle has a first length converging at an angle less than 180° and greater than about 130°. A second length of the nozzle converges at an angle between about 10° and about 30°.

In one of its primary applications, the device is used in combination with a source of water, an apparatus containing a concentrated liquid, and a water tube. The device and the tube are connected to flow water from the source to the apparatus.

For reasons explained in the following detailed description, the combination includes a restrictor inhibiting water back flow from the apparatus to the source. In one embodiment, the tube is connected to the source and the restrictor is between the tube and the source. In another embodiment, the device is mounted on the apparatus and the device includes a restrictor such as a movable ball.

In another aspect of the invention, the device has a secondary or "overflow" outlet mounted to the containment bowl. Such outlet is mounted for limited pivoting movement with respect to the bowl so that liquid out of such outlet can be prevented from flowing in unwanted directions. In a more specific embodiment, the secondary outlet includes a flow-restricting structure, e.g., a pair of spaced screen discs, providing laminar flow.

These and other aspects of the invention are set forth in the following detailed description and in the drawings.

BEST MODES FOR CARRYING OUT THE INVENTION

Figures 1, 1A:
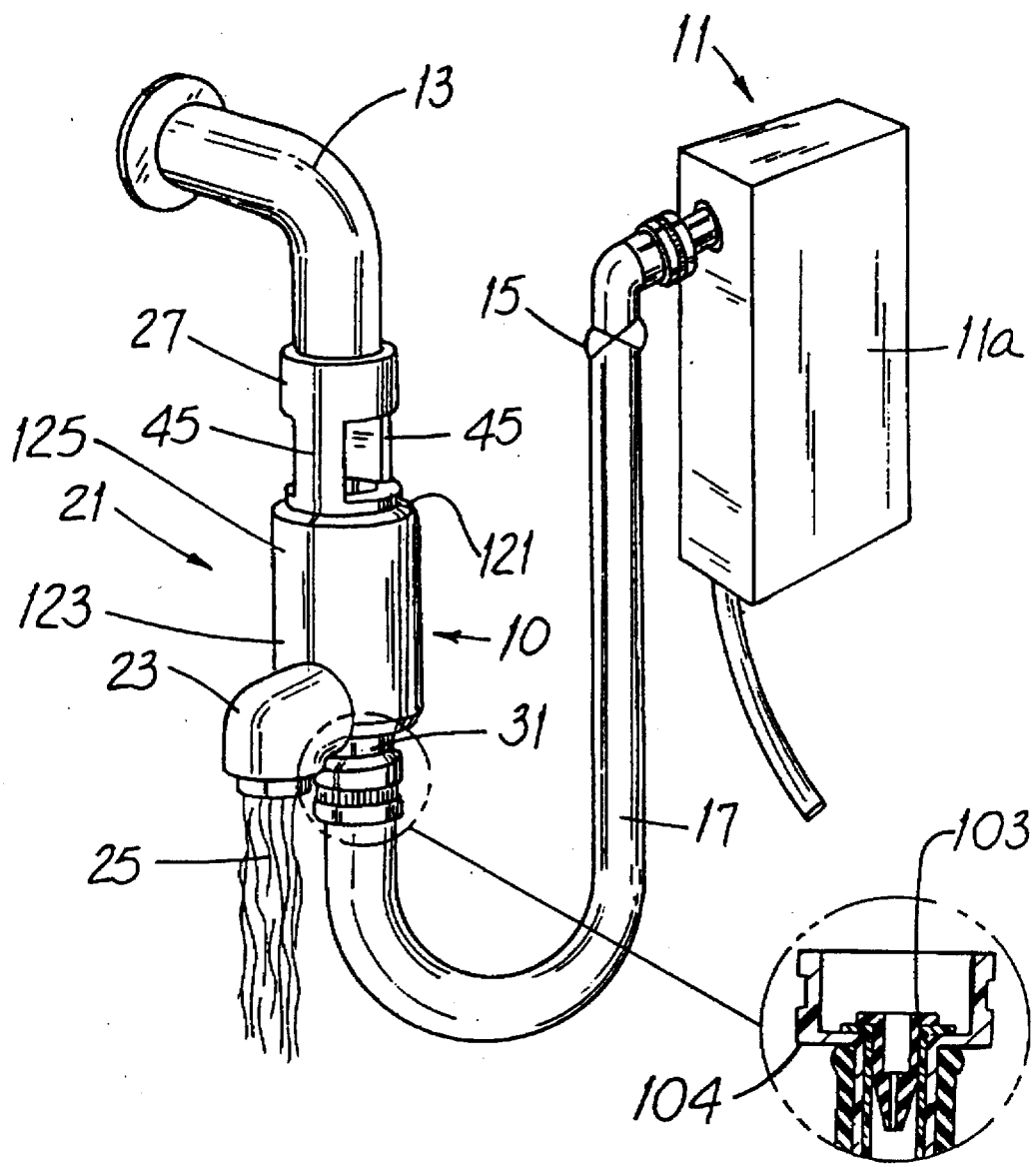
FIG. 1 is a perspective view of the new device shown in conjunction with one arrangement of a faucet, a water line and equipment water-fed by the faucet, device and line.
FIG. 1A is an enlarged inset view of a portion of FIG. 1 showing a duckbill restrictor in section and with the valving portions thereof spread slightly for ease of understanding.

Before describing the new back flow prevention device 10, it will be helpful to have an understanding of but one type of application in which such device 10 may be used. Referring first to FIG. 1, persons, e.g., members of custodial staff, who are engaged in cleaning of buildings often use an apparatus 11 that requires water. An example is dispensing equipment 11a which contains one or more different liquids in concentrated form. Such concentrated liquids are mixed with water to form a dilute liquid, e.g., a cleaning liquid. Merely as examples, concentrated liquids may include a neutral cleaner, a glass cleaner and a "spray-and-wipe" cleaner/degreaser.

The new device 10 is connected as shown in FIG. 1 to permit a user to flow water from a faucet 13 into the equipment 11a for solution preparation. Such water is mixed in appropriate ratio to provide a cleaning solution of proper strength. From the foregoing, it is apparent that it is highly desirable (and usually required by local law or codes) that concentrated liquid and solutions made from them are to be prevented from entering the potable water system to which the faucet 13 is connected. The leading manufacturer of dispensing equipment 11a (sold under the trademark SOLUTIONS CENTER®) and liquid concentrates used therewith is S.C. Johnson & Son, Inc. of Racine, Wis.

Figure 2:
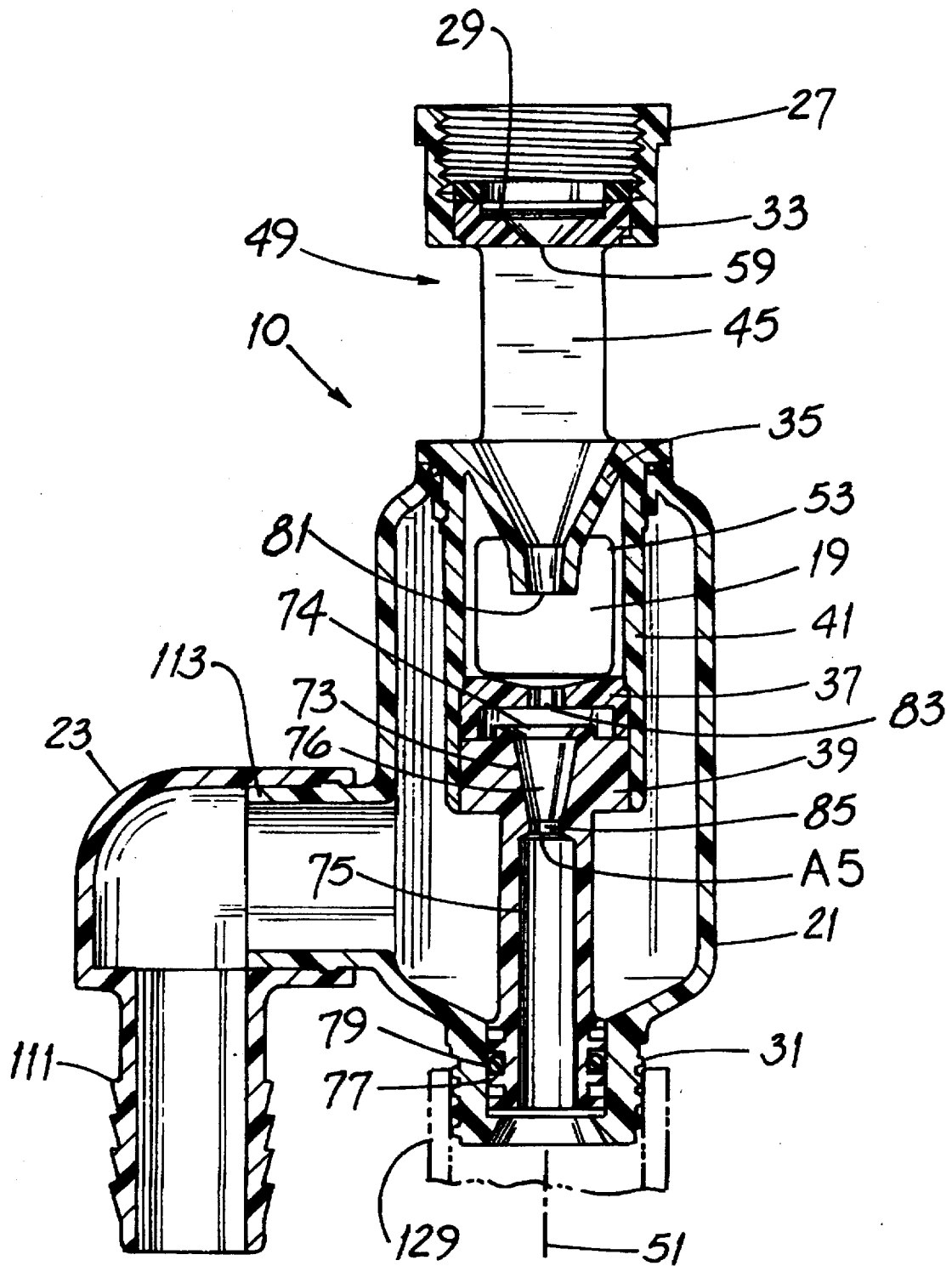
FIG. 2 is a cross-sectional elevation view of the device shown in FIG. 1.
Figure 3:
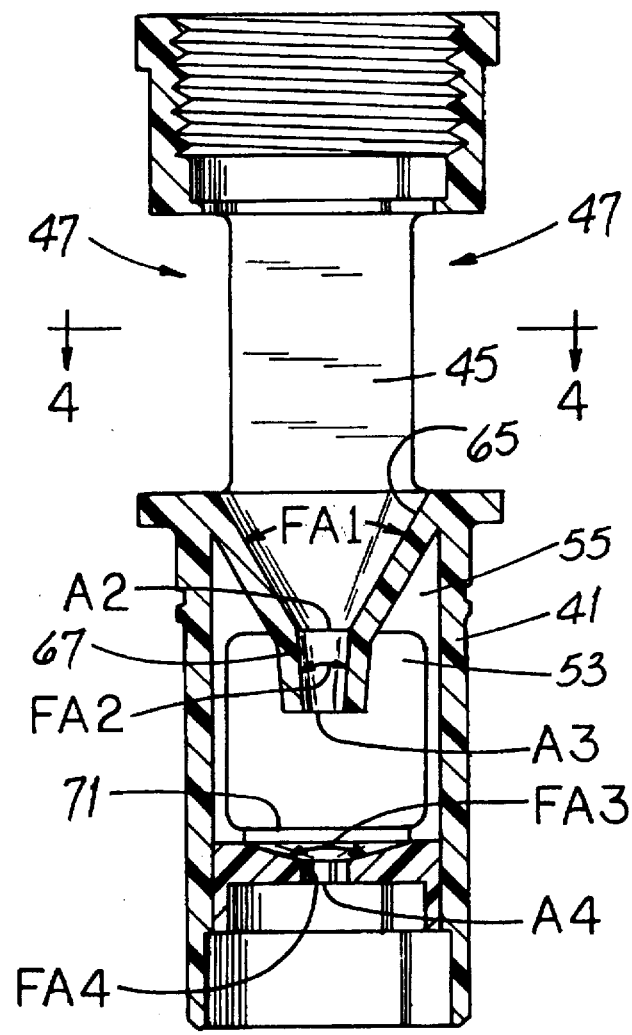
FIG. 3 is a cross-sectional elevation view of a portion of the device shown in FIG. 2.
Figure 4:
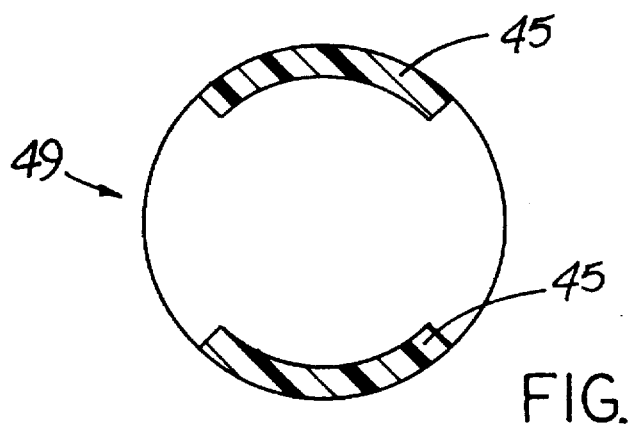
FIG. 4 is a plan view taken generally along the viewing plane 4—4 of FIG. 3.

Referring also to FIGS. 2, 3 and 4, the device 10 may be used for other purposes as well. If a valve 15 is provided in the line 17 from the device 10 to the apparatus 11 and if such valve 15 is closed when the faucet 13 is opened, water flows through a secondary air gap 19 and into a containment bowl 21. An outlet 23 is in flow communication with the containment bowl 21 and the water 25 flows from the outlet 23 (as shown) or from a hose connected to such outlet 23. Water so obtained may be used to fill a pail, for example.

(Where the apparatus 11 includes SOLUTIONS CENTER® or similar equipment 11a, such equipment 11a has plural eductors connected in parallel to, e.g., a faucet 13. Water may be directed to each of the eductors by actuating a magnetic valve associated with a particular eductor. In such an arrangement, the valve 15 is not used. An eductor of the type used in SOLUTIONS CENTER® equipment 11a is described in published PCT Application No. PCT/US91/02552 and in U.S. application Ser. No. 07/513,401 filed on Apr. 23, 1990, now U.S. Pat. No. 5,544,810. The latter is incorporated herein by reference.)

The new back flow prevention device 10 includes an inlet 27 for connection to a source of fresh water, usually potable water. An inlet screen apparatus 29 changes incoming liquid flow from turbulent to substantially laminar flow. The device 10 also has a primary outlet 31 from which water flows to dispensing equipment 11a, for example.

There are axially-aligned first, second, third and fourth nozzles 33, 35, 37 and 39, respectively. The nozzles 33, 35, 37, 39 are in series and coaxial flow relationship and the latter three nozzles 35, 37, 39 are in a tube-like, generally cylindrical housing 41. Aspects of such nozzles 33, 35, 37, 39 are described in more detail below.

A pair of support ribs 45 extend between the inlet 27 and the housing 41 and in cross-section as in FIG. 4, such ribs 45 constitute arcs of a circle. The diametrically-opposed openings 47 bounded by such ribs 45 define the primary air gap 49.

Such air gap 49 prevents liquid at the second nozzle 35 from being drawn into the first nozzle 33 and thence to the inlet 27 and into a faucet 13. The existence of such air gap 49 is also visually apparent and the openings 47 are sufficiently large that, as is the common practice of plumbing inspectors, a human adult finger can be thrust therethrough. In a specific embodiment, the openings 47 are slightly longer than one inch (2.54 cm) measured parallel to the long axis 51 of the device 10 and span an arc of about 90°.

Referring particularly to FIGS. 2 and 3, the device 10 includes a secondary air gap 19 fixed with respect to the second nozzle 35, spaced somewhat away from such nozzle 35 and positioned between the nozzles 35 and 37. In the specific illustrated embodiment, the air gap 19 is an aperture 53 in the wall 55 of the housing 41 and is in flow communication with the drain outlet 23. That is to say, the secondary air gap 19 is between the second and third nozzles 35, 37 so that any liquid back-flowing from the primary outlet 31 toward the inlet 27 will, after passing through the third nozzle 37, drain through the secondary air gap 19 and through the outlet 23. Such outlet 23 may be connected to a flexible tube which extends to a container, floor drain or the like.

Thus, back-flowing liquid is "controlled" rather than being permitted to spill onto the floor through the primary air gap 49. In fact, in the new device 10, liquid flowing backward at near-zero pressure is prevented from reaching the primary air gap 49. (The foregoing description contemplates that the device 10 will be installed with its inlet 27 upward as shown in FIG. 2.)

Figure 5:
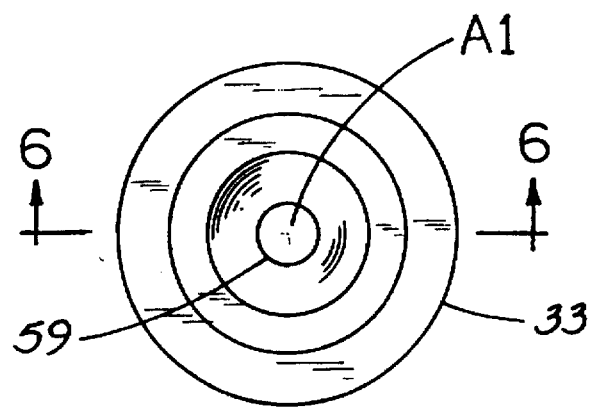
FIG. 5 is a top plan view of the device first nozzle shown in FIG. 2.
Figure 6:
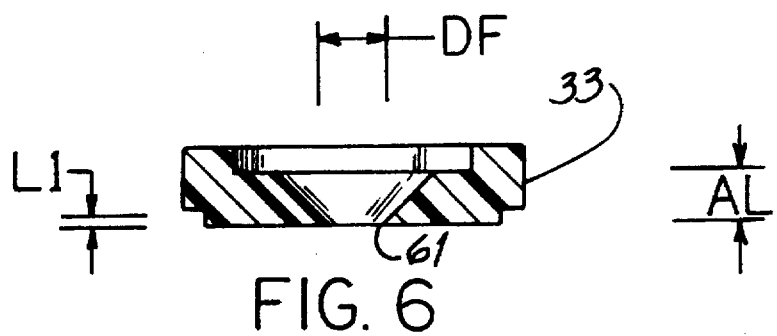
FIG. 6 is a sectional view of the nozzle of FIG. 5 taken along the viewing plane 6—6 thereof.

More specific embodiments of the invention involve the configuration(s) of the individual nozzle(s) 33, 35, 37, 39. Referring also to FIGS. 5 and 6, in a highly preferred embodiment, the first (or upstream) nozzle 33 has a substantially "knife-like" or sharp-edged orifice or opening 59. Such opening 59 has a first flow area A1 through which liquid is discharged to the second nozzle 35. The ratio of the diameter DF of the opening 59 to the axial length L1 of the edge 61 defining such opening 59 is between about 10:1 and about 21:1. In a specific embodiment, the axial length L1 is no more than about 0.010 inches (0.25 mm). Being of minimal axial length, the foregoing configuration of the first nozzle 33 helps minimize resistance to liquid flow and substantially avoid introducing turbulence.

In another of its aspects, ratio of the axial length AL of the tapered portion of the nozzle 33 to the diameter DF of the nozzle opening 59 is in the range of 0.7 to 1.1. In a specific embodiment, such ratio is about 0.87.

Referring particularly to FIGS. 2 and 3, the second nozzle 35 has a dual taper with a first portion 65 which, considered in an upstream-to-downstream direction, converges. Convergence is at a first angle FA1. The second nozzle 35 also has a second portion 67 converging at a second angle FA2 that is less than the first angle FA1. Preferably, the first angle FA1 is between about 40° and about 80° and, most preferably, such first angle FA1 is about 60°. Preferably, such second angle FA2 is between about 5° and about 15° and, most preferably, such angle FA2 is about 10°.

These portions 65, 67 abut at a junction which defines a second flow area A2 and the ratio of the second flow area A2 to the first flow area A1 is between about 1.05:1 and about 2:1. This allows the device 10 to accommodate a range of water pressure and also results in flow which is more laminar.

Similarly, the third nozzle 37 also has a dual taper. Such nozzle 37 has a first length converging at an angle FA3 which is between about 130° and about 180° and, most preferably, is about 150°. A second length of the nozzle 37 converges at an angle FA4 which is between about 5° and about 15° and, most preferably, is about 10°. Such dual taper configuration helps to rapidly clear any water adjacent to the flow stream, thus preventing any water from collecting in the housing 41 and splashing back. To put it in other words, a stream of liquid flowing from the second nozzle 35 to the third nozzle 37 acts (by virtue of venturi action) as a "collector" of any liquid present immediately above the third nozzle 37 and even of liquid in the containment bowl 21 to the extent such liquid is above the lower edge 71 of the aperture 53.

In another aspect of the invention, the device 10 has a fourth nozzle 39 with a converging section 73 which flows liquid to an elongate, slightly-diverging section 75. The distal end 77 of the nozzle 39 is in sealed engagement with the containment bowl 21. O-ring seals 79 are used for that purpose.

The inlet cone 74 of the converging section 73 has an included angle of about 45° and the secondary cone 76 has an included angle of about 20°. The discharge opening 85 from the converging section 73 is of substantially uniform diameter along its length.

Figure 7:
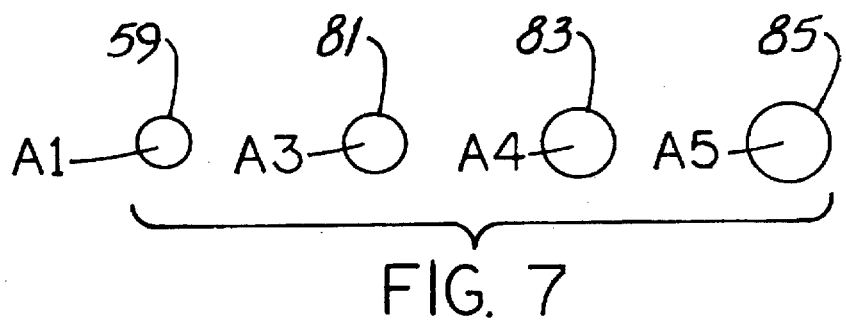
FIG. 7 is a comparative plan view, enlarged about two times, of the discharge openings of the device nozzles.
Figure 8:
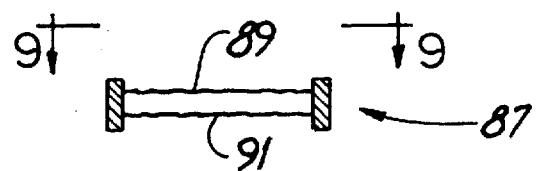
FIG. 8 is a sectional elevation view of one embodiment of a flow-smoothing apparatus.

Referring particularly to FIGS. 2 and 7, each of the device nozzles 33, 35, 37, 39 has a discharge opening 59, 81, 83, 85, respectively. As represented in FIG. 7, such openings have progressively increasing areas A1, A3, A4, A5, respectively, when considered from upstream to downstream. This arrangement dramatically reduces, if not entirely eliminates, "back splashing."

Figure 9:
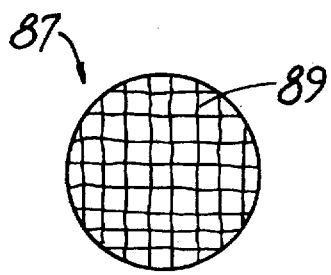
FIG. 9 is a plan view of one variant of the embodiment of FIG. 8 taken along the viewing plane 9—9 thereof.
Figure 10:
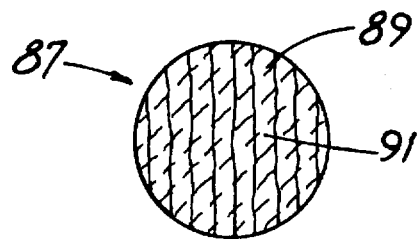
FIG. 10 is a plan view of another variant of the embodiment of FIG. 8 taken along the viewing plane 9—9 thereof.
Figure 12:
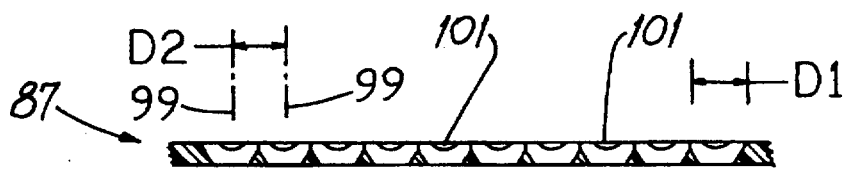
FIG. 12 is a section view of the apparatus of FIG. 11 taken along the viewing plane 12—12 thereof. Part is broken away.
Figure 13:
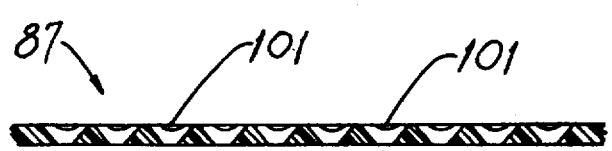
FIG. 13 is a section view of the apparatus of FIG. 11 taken along the viewing plane 13—13 thereof. Part is broken away.
Figure 14:
FIG. 14 is a section view of the apparatus of FIG. 11 taken along the viewing plane 14—14 thereof. Part is broken away.
Figure 11:
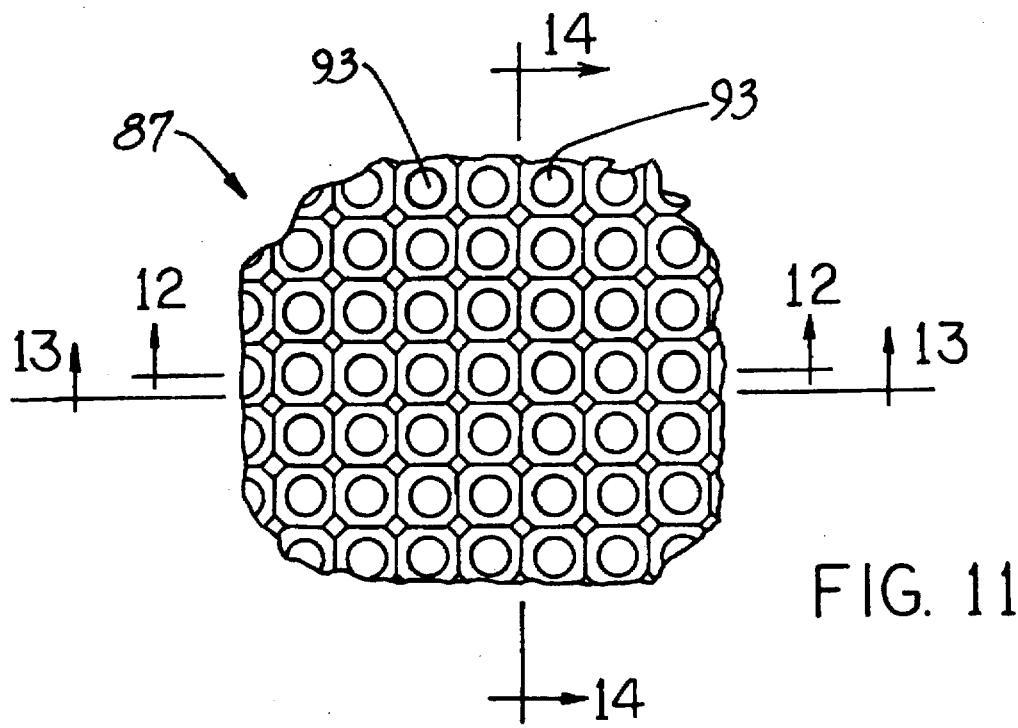
FIG. 11 is a top plan view of another embodiment of a flow-smoothing apparatus. Part is broken away.
Figure 15:
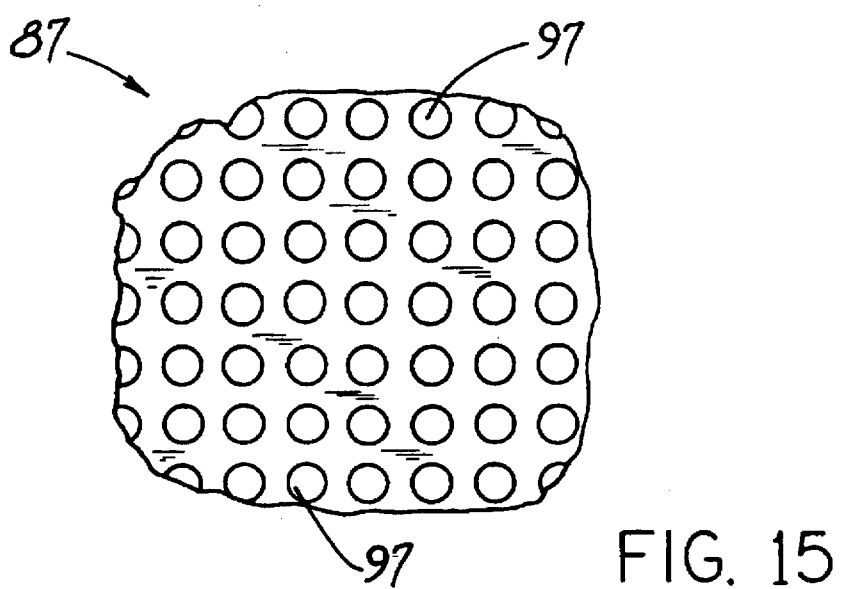
FIG. 15 is a bottom plan view of the apparatus of FIG. 11. Part is broken away.

Referring to FIGS. 2, 8, 9 and 10, the device 10 preferably includes an apparatus 87 for "smoothing" turbulent liquid entering the inlet 27 and causing such liquid to exhibit substantially laminar flow rather than turbulent flow. In one embodiment, the apparatus 87 includes a plurality of spaced screens 89, 91 vertically aligned with one another in an overlapping, series flow, coaxial relationship. In variant embodiments, such screens 89, 91 may be in registry with one another as shown in FIG. 9 or angled to one another as shown in FIG. 10.

Referring also to FIGS. 11–15, another embodiment of the apparatus 87 includes a plurality of downwardly-converging passages 93 formed in the body 95 of such apparatus 87. Such passages 93 are shaped like truncated cones and, most preferably, all passages 93 have the same top diameter dimension D1, the same outlet hole 97 diameter and the same rate of taper. Each passage 93 is of circular cross-section along its length and the center axes 99 of such passages 93 are spaced by a dimension D2 which is somewhat less than the top diameter D1. That is, such passages 93 are in overlapping relationship.

When so formed, each passage 93 "breaks into" one or more adjacent passages 93 and "upstream-pointing" sharp edges 101 are thereby formed. It has been found that this embodiment with its sharp edges 101 is extremely effective in providing laminar output flow even though liquid flowing into the apparatus 87 exhibits turbulent flow.

A specific apparatus 87 is a disc having a matrix of passages 93 in overlapping relationship. The centerline axes 99 of such passages 93 are spaced by a distance of 0.030 inches (0.76 millimeters), the downstream outlet opening has a diameter of 0.020 inches (0.51 millimeters), the diameter of the apparatus 87 is about 0.70 inches (about 1.75 cm) and the included angle of taper is in the range of 2°–4°. However, such dimensions and angle can vary widely so long as the aforementioned sharp edges are provided.

Referring again to FIG. 1, certain considerations arise (or may arise) when the new device 10 is used in combination with a source of water, e.g., a faucet 13, an apparatus 11 such as dispensing equipment 11a containing a concentrated liquid, and a water tube such as the hose line 17. The equipment 11a is usually mounted at an elevation above that of the faucet 13.

In the arrangement of FIG. 1, the faucet 13, device 10, hose line 17 and equipment 11a are in flow relationship. In such arrangement (and but for another feature of the invention), gravity will cause water to flow backward along the line 17 and out of the secondary outlet 23. It has been found that where the difference in elevation is substantial, water may even "fountain" or "jet" upward through the nozzles 39, 37, 35 and out of the primary air gap 49 or, in an extreme case, even through nozzle 33 and into the faucet 13.

In the illustrated, highly preferred combination in which the device 10 is connected directly to the faucet 13 and the device 10 and equipment 11a are connected by a line 17, there is a restrictor 103 inhibiting back flow of water from the equipment 11a to the faucet 13. The line 17 is flow-coupled to the faucet 13 and the restrictor 103 is between the line 17 and the faucet 13. In a specific embodiment, the restrictor 103 (see FIG. 1A) is in a hose fitting 104, is made of flexible material, e.g., rubber or Buna, resembles a mitral valve and is commonly known as a "duckbill" valve. A restrictor 103 of this type is a full restrictor in that it permits substantially no upstream flow, permitting flow only in the downstream direction, i.e., from the device 10 to the equipment 11a.

In the arrangement of FIG. 1, the primary purpose of the restrictor 103 is to retain prime in the line 17.

Figure 16:
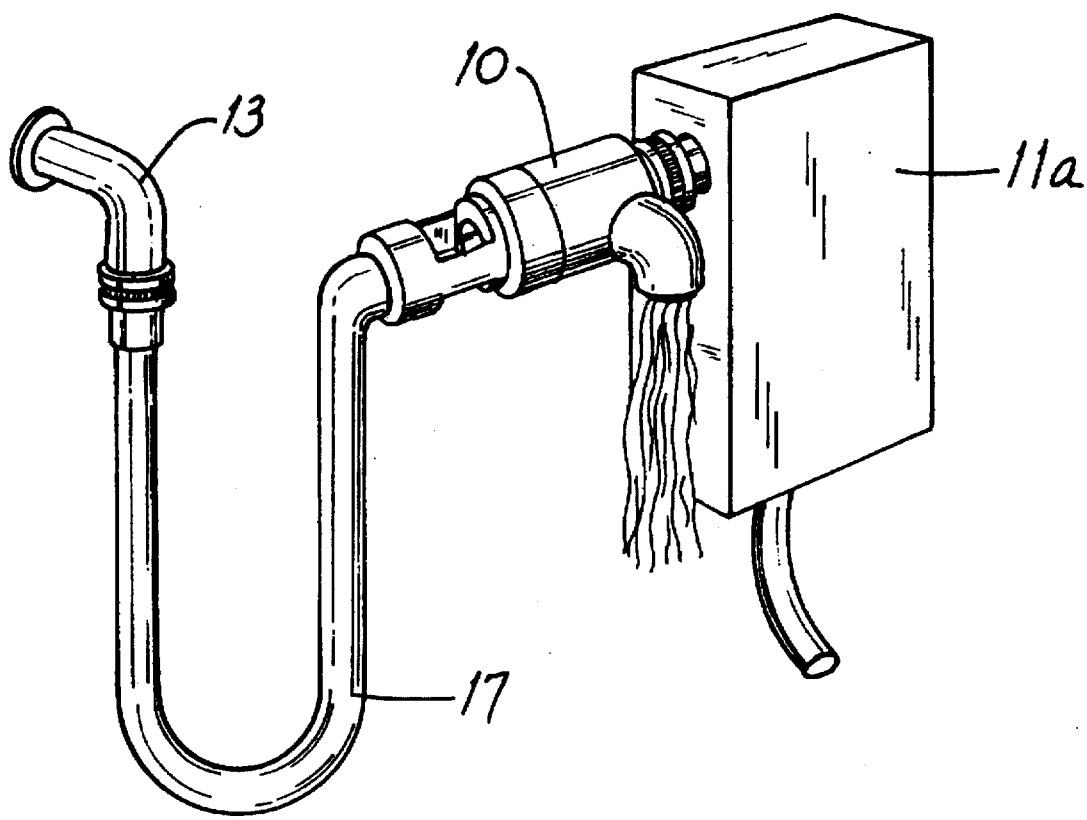
FIG. 16 is a perspective view of the new device shown in conjunction with another arrangement of a faucet, a water line and equipment water-fed by the faucet, line, and device.

In the arrangement of FIG. 16, the faucet 13, line 17, device 10 and equipment 11a are also in flow relationship with the horizontally-oriented device 10 attached directly to the equipment 11a and the line 17 extending between the faucet 13 and the device 10. In this arrangement, the tendency for water to flow backward out of the equipment 11a and through the device 10 is substantially diminished, even in the absence of a full restrictor 103. During forward flow, a screen 106 retains the ball. If the device 10 has no ball 105 (as in the embodiment of FIG. 2), no screen 106 is needed.

Figure 17:
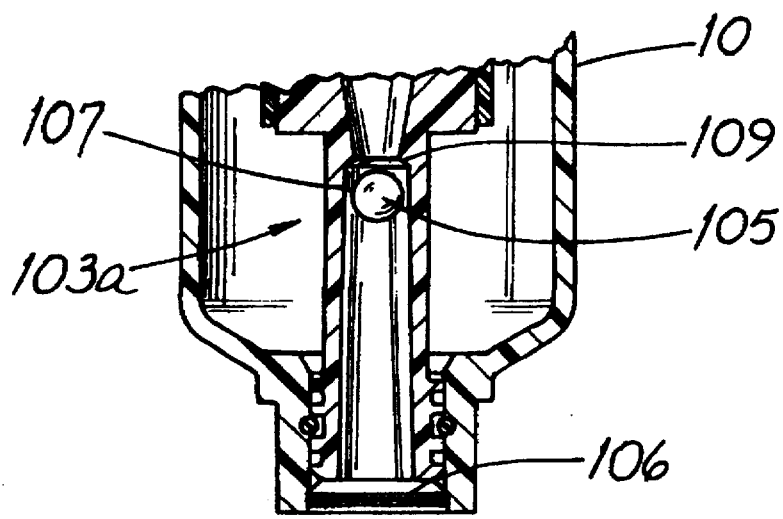
FIG. 17 is a cross-sectional elevation view of a portion of the device of FIG. 2 and showing a restrictor in the device fourth nozzle. Parts are broken away.

However, in a preferred combination, the device 10 includes a partial restrictor 103a (sometimes referred to as a "diffuser") such as the ball 105 in the diverging section 75 of the nozzle 39 as shown in FIG. 17. Such ball 105 and section 75 are cooperatively sized to provide a slight annular clearance 107 therebetween so that the ball 105 does not entirely prevent back flow but only inhibits it to a degree preventing the described "fountain" effect.

When the combination is so configured, water tending to flow backward is merely permitted to leak around the ball 105 and either through the secondary air gap 19 and the outlet 23 or through the primary air gap 49. (In the arrangement of FIG. 17, water tending to flow backward out of the equipment 11a is at very low pressure and the ball 105 does not seal tightly against the seat 109.)

It is to be appreciated that in the arrangement of FIG. 1, the flexible restrictor 103 and the ball-and-nozzle restrictor 103a may be used interchangeably. It is also to be appreciated that if the ball-and-nozzle restrictor 103a is used in the arrangement of FIG. 1, the column of water in the line 17 is likely to urge the ball 105 rather snugly against the seat 109 and essentially "zero-leak" shutoff is thereby provided.

As shown in FIG. 2, an embodiment of the device 10 includes a secondary outlet 23 equipped with a barbed fitting 111 suitable for attachment of a hose. The outlet 23 and the stub 113 on which it is mounted are configured to permit 360° rotation of the outlet 23 on the stub 113. When the device 10 is not in use to feed an apparatus 11 and when flow from the outlet 31 is significantly impeded, turning on a faucet 13 to which the device 10 is connected will cause water to flow through the secondary air gap 19 and out of the outlet 23 to fill a rinse bucket or the like.

Figure 18:
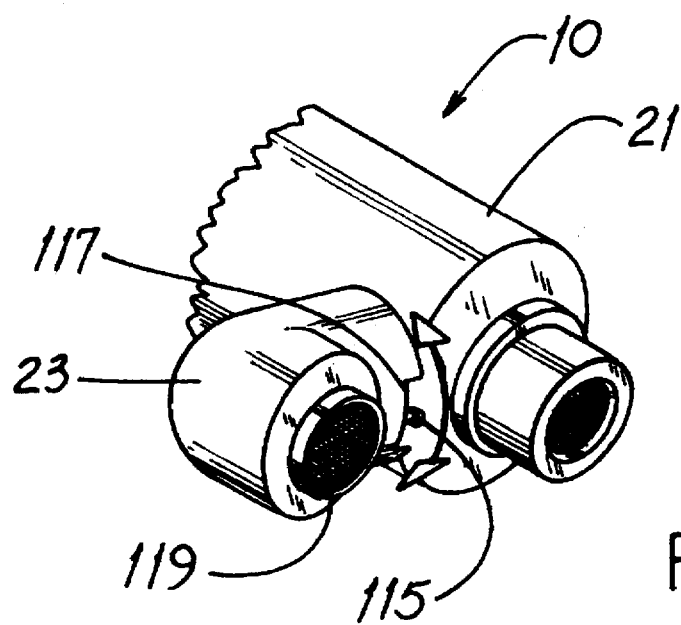
FIG. 18 is another perspective view of the new device showing a variant embodiment for limiting pivoting movement of the secondary outlet.

But it is sometimes desirable to discourage attachment of a hose to the secondary outlet 23 and to limit the extent to which such outlet 23 can be pivoted. Referring next to FIG. 18, another embodiment of the device 10 has a secondary outlet 23 which is free of a barbed fitting and which is mounted to the containment bowl 21 for limited pivoting movement with respect thereto. Pivoting movement is limited by a stop pin 115 on the stub 113. Such pin 115 is in registry with a notch 117 formed in the outlet 23. In a specific embodiment, the arc length of the notch 117 is about 60°.

In a highly-preferred embodiment, the secondary outlet 23 includes a flow-restricting structure 119 providing laminar flow. Suitable structures 119 include the apparatus 87 disclosed in FIGS. 8–15 and the related description.

And that is not all. The device 10 incorporates yet another convenience feature. Referring again to FIG. 1, a highly preferred embodiment of the containment bowl 21 is configured with a circumferential "slip joint" 121 so that after the inlet 27 is connected snugly to a faucet 13, that lower portion 123 of the bowl 21 on which the outlet 23 is mounted can be rotated with respect to the upper portion 125 to radially position such outlet 23 as desired.

Referring again to FIG. 2, the device 10 need not be used with dispensing equipment 11a. By attaching a short length of hose 129 to the primary outlet 31, the device 10 may be used to fill a bucket or the like. When the device 10 is so used, the resulting back pressure at the outlet 31 is likely to be substantially lower than that at the outlet 31 when the device 10 is used with equipment 11a. With such low back pressure, there is unlikely to be much if any flow through the secondary air gap 19 and the secondary outlet 23.

From the foregoing and from an inspection of FIG. 1 and 16, it is apparent that custodial staff may no longer leave open hot and cold shutoff valves feeding the faucet 13 and rely upon equipment 11a to shut off water. Water would flow through the air gap 19 and outlet 23. Rather, such hot and cold shutoff valves must be closed and water cross-flow is thereby prevented.

As used herein and unless otherwise indicated, the term "back flow" means flow of a liquid from a vessel into a potable water system caused by the vessel being at a pressure greater than that of the water system. For example, the system pressure may be above ambient and the vessel pressure greater than system pressure. Or, in the alternative, system pressure may temporarily be below ambient pressure and the vessel at or above ambient pressure. Back flow is sometimes referred to as "back siphoning." As used herein, the term "sharp edge" as applied to the apparatus 87 of FIGS. 11–15 means an edge having a dimension measured normally to the axis 51 that is substantially equal to zero.

While the principles of the invention have been shown and described in connection with one or more preferred embodiments, it is to be understood clearly that such embodiments are exemplary and not limiting.

INDUSTRIAL APPLICABILITY

Among other uses, the new device 10 is useful as an "infeed" device providing water to dispensing equipment 11a. The device 10 may also be used where it is desirable to have water available from two different outlets, i.e., outlets 31 and 23.

What is claimed:

1. In a device for preventing back flow of water into a potable water system, and including (a) a long axis, (b) first, second and third nozzles in coaxial relationship, and (c) an air gap extending between the first and second nozzles and being bounded by opposed openings, the improvement wherein the air gap is a primary air gap and the device includes:

a secondary air gap fixed with respect to the second nozzle, such secondary air gap including an aperture radially eccentric to the long axis and axially spaced from the primary air gap that provides a flow path for diverting any back flow of water away from the primary air gap.

2. The device of claim 1 including a drain outlet and wherein the secondary air gap is in flow communication with the drain outlet.

3. The device of claim 2 including:

a tubular housing extending away from the primary air gap; and a containment bowl around the housing for confining water flowing through the secondary air gap.

4. The device of claim 3 wherein:

the housing includes a wall;

the aperture is in the wall; and the aperture opens to the containment bowl.

5. The device of claim 3 wherein:

a fourth nozzle is in the housing and has a nozzle distal end; and the distal end and the containment bowl are in sealed engagement with one another.

6. The device of claim 3 wherein:

the containment bowl includes an upper portion and a lower portion having an outlet mounted thereon; and the bowl has a slip joint between the portions, thereby permitting the outlet to be positioned with respect to the upper portion.

7. The device of claim 2 including a housing around the second nozzle and a containment bowl around the housing and wherein the drain outlet is connected to the containment bowl.

8. The device of claim 1 including a fourth nozzle in series flow relationship to the first, second and third nozzles and wherein:

each nozzle has a discharge opening; and the discharge openings are of increasing area in a downstream direction.

9. The device of claim 1 including a screen apparatus providing laminar liquid flow to the first nozzle and wherein:

the screen apparatus includes a plurality of screens.

10. The device of claim 1 including a screen apparatus upstream of the first nozzle and providing laminar flow of liquid to the first nozzle and wherein:

the screen apparatus includes a plurality of downwardly-converging passages in overlapping relationship, thereby forming a plurality of sharp edges oriented in an upstream direction.

11. The device of claim 1 in combination with (a) a source of water, (b) an apparatus containing a concentrated liquid, and (c) a water tube, and wherein:

the device and the tube are connected to flow water from the source to the apparatus; and the combination includes a restrictor inhibiting water back flow from the apparatus to the source.

12. The combination of claim 11 wherein the tube is flow-coupled to the source and the restrictor is between the tube and the source.

13. The combination of claim 11 wherein the device is mounted on the apparatus and includes a restrictor.

14. The combination of claim 13 wherein the restrictor includes a movable ball.

15. In a device for preventing back flow of contaminated water into a potable water system, the device including (a) first and second nozzles in series flow relationship to one another, and (b) an air gap between the first and second nozzles, the improvement wherein:

the first nozzle defines a sharp-edged opening for discharging liquid to the second nozzle;

the sharp-edged opening has an axial length;

the opening has a diameter;

the ratio of the diameter to the axial length is between about 10:1 and about 21:1; and wherein the device further includes:

a third nozzle in series flow relationship to the first and second nozzles;

a tubular housing around the third nozzle;

a primary outlet in series flow relationship to the nozzles;

a containment bowl around the housing; and a secondary outlet mounted to the containment bowl for limited pivoting movement with respect thereto.

16. The device of claim 15 wherein:

the second nozzle has a first portion converging at a first angle and a second portion converging at a second angle less than the first angle.

17. The device of claim 16 wherein:

the sharp-edged opening has a first flow area;

the portions abut at a junction which defines a second flow area; and the ratio of the second flow area to the first flow area is between about 1.05:1 and 2:1.

18. The device of claim 17 wherein the second angle is between about 10° and about 30°.

19. The device of claim 16 wherein the second angle is between about 10° and about 30°.

20. The device of claim 15 wherein the third nozzle has a dual taper.

21. The device of claim 20 wherein:

the third nozzle has a first length converging at an angle less than about 180° and greater than about 130°.

22. The device of claim 21 wherein the third nozzle has a second length converging at an angle between about 10° and about 30°.

23. The device of claim 15 wherein the axial length is no more than about 0.010 inches (0.25 mm).

24. The device of claim 15 including a fourth nozzle in series flow relationship to the first, second and third nozzles and wherein:

each nozzle has a discharge opening; and the discharge openings are of increasing area in a downstream direction.

25. The device of claim 15 including a screen apparatus providing laminar liquid flow to the first nozzle and wherein:

the screen apparatus includes a plurality of screens.

26. The device of claim 15 including a screen apparatus upstream of the first nozzle and providing laminar flow of liquid to the first nozzle and wherein:

the screen apparatus includes a plurality of downwardly-converging passages in overlapping relationship, thereby forming a plurality of sharp edges oriented in an upstream direction.

27. The device of claim 15 wherein the secondary outlet includes a flow-restricting structure providing laminar flow.

28. In a device for preventing back flow of contaminated water into a potable water system, the device including (a) first and second nozzles in series flow relationship to one another, and (b) an air gap between the first and second nozzles, the improvement wherein:

the first nozzle defines a sharp-edged opening for discharging liquid to the second nozzle;

the sharp-edged opening has an axial length;

the opening has a diameter;

the ratio of the diameter to the axial length is between about 10:1 and about 21:1; and wherein the device further includes:

a screen apparatus upstream of the first nozzle and providing laminar flow of liquid to the first nozzle; and wherein:

the screen apparatus includes a plurality of downwardly-converging passages in overlapping relationship, thereby forming a plurality of sharp edges oriented in an upstream direction.

* * * * *